June 2, 1942.  E. LUNDGREN  2,285,216
APPARATUS FOR FEEDING PULVERULENT MATERIAL
Filed Aug. 31, 1940   2 Sheets-Sheet 1
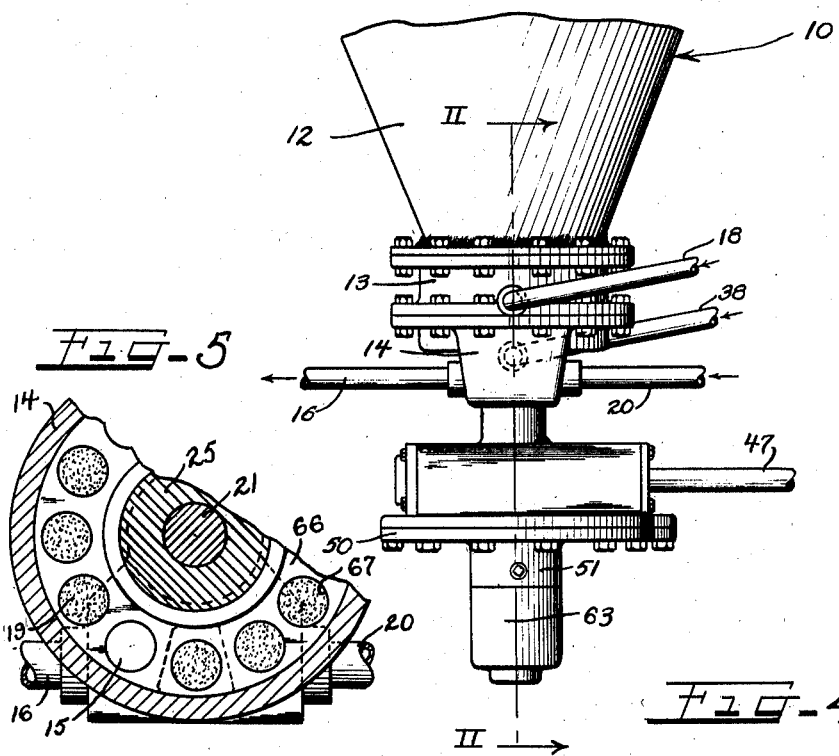
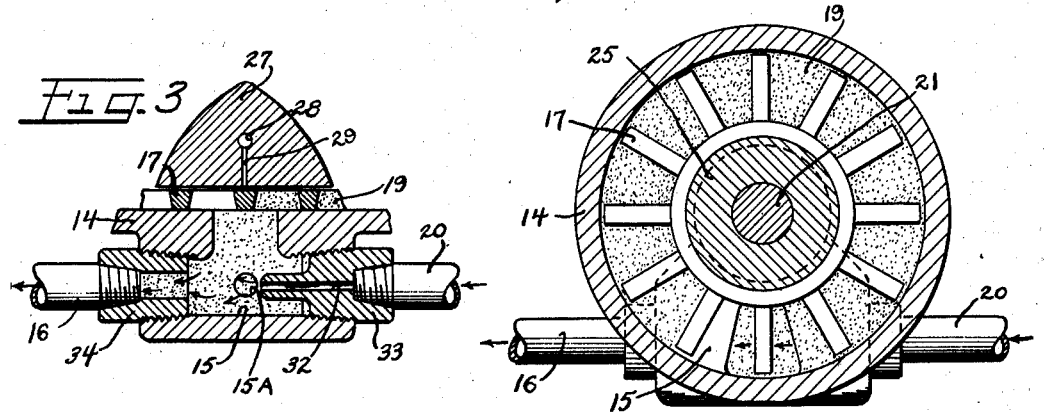
Inventor
Eric Lundgren.

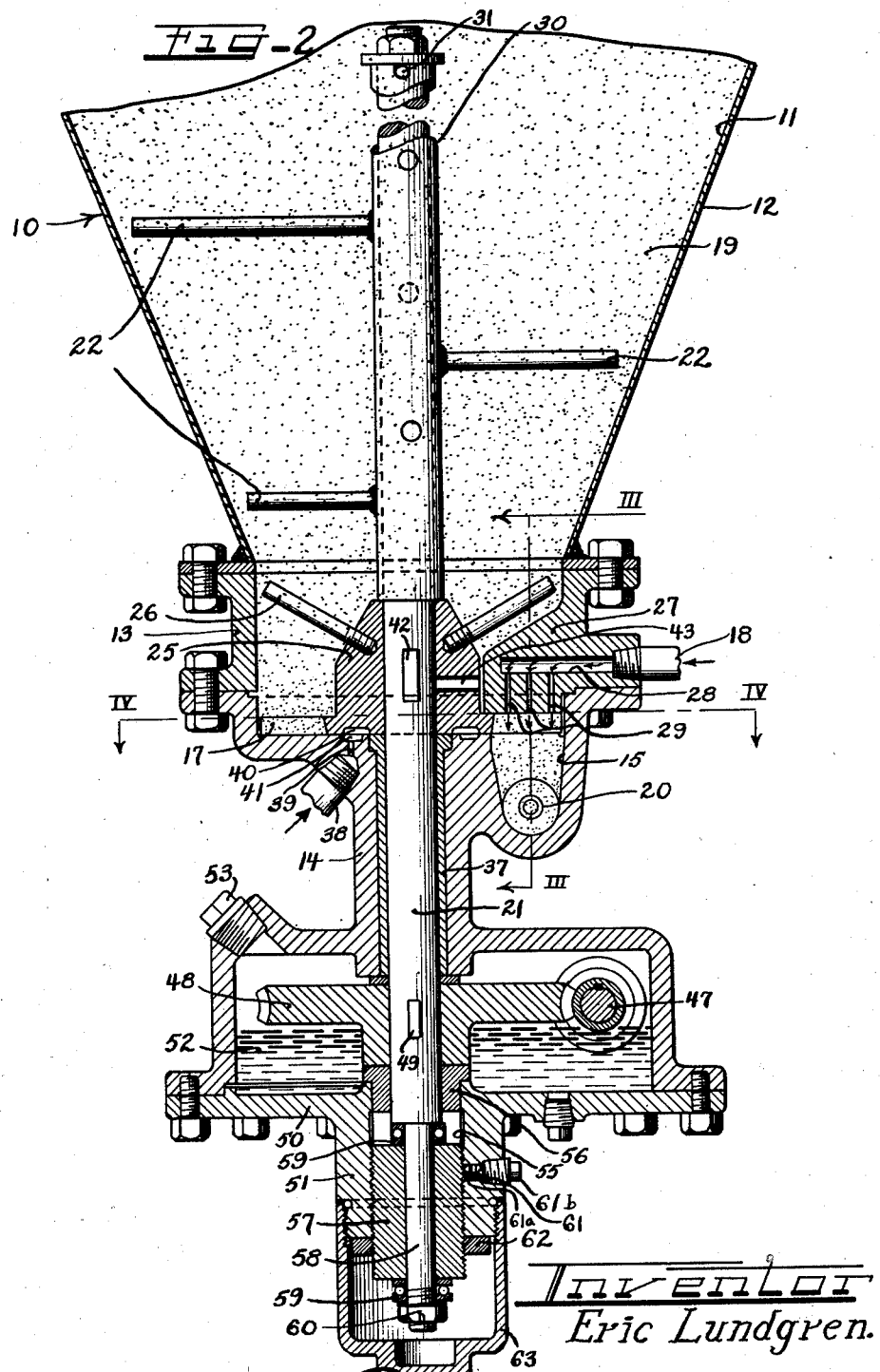

Patented June 2, 1942

2,285,216

UNITED STATES PATENT OFFICE 2,285,216

APPARATUS FOR FEEDING PULVERULENT MATERIAL

Eric Lundgren, Braddock Heights, Md., assignor to E. B. & A. C. Whiting Company, Burlington, Vt., a corporation of Vermont Application August 31, 1940, Serial No. 355,010

2 Claims. (Cl. 302—49)

This invention relates to apparatus for feeding pulverulent material. More particularly, the invention pertains to means for feeding, continuously and at a predetermined uniform rate, into a conduit system, finely divided matter, such as ground talc, from a bulk mass of such matter.

Methods for applying a dust, powder, perfume or other treating agent, in a finely divided form, to a porous, open mesh body, such as a web of rubberized fibrous material, may include suspending the dusting agent in a stream of air or other gas circulating within a substantially closed circuit system, the open mesh material to be impregnated passing through a portion of the system in such manner that the stream of thus laden gas traverses the open mesh material.

The present invention provides means adapted for feeding ground talc or the like into such a conduit system including a hopper, a chamber connecting the bottom of the hopper with a tube adapted to discharge into said conduit system, a spider rotatably disposed in the bottom of said hopper so that the arms of the spider can sweep across the mouth of said chamber to feed talc or the like from the hopper into the chamber, and air jets for displacing talc or the like from the pockets between the arms of the spider into the chamber and thence into the tube. The spider may be driven by a shaft projecting upwardly into the hopper and provided with radial arms that agitate the bulk mass of talc or other finely divided matter in the hopper.

Uniformly sized portions of talc or other finely divided matter may thus be removed from a bulk mass at a predetermined rate and blown, first into a chamber and thence into a tube adapted to discharge into a conduit system such as the one described hereinabove. Talc or the like may thereby be fed into such a conduit system not only at any desired uniform rate but may also be introduced in the state in which it is to be utilized in said conduit system, namely, as a gaseous suspension.

It is therefore an important object of the present invention to provide apparatus for feeding, at a predetermined uniform rate, finely divided matter from a bulk mass into a conduit system or the like in the form of a gaseous suspension.

Another important object of this invention is to provide, in an apparatus for the purpose indicated including a hopper and a chamber connecting the bottom of this hopper with a tube adapted to discharge into a conduit system, a spider or the like rotatably disposed in the bottom of the hopper so that the arms of the spider can sweep across the mouth of the chamber.

Another object of the invention is to provide, in an apparatus of the type described in the preceding paragraph, air jets for blowing talc or other finely divided material from the pockets between the arms of the spider into the chamber and other air jets for blowing the talc thence into the tube.

Still another object is to provide, in an apparatus of the type described in the preceding paragraphs, a shaft for driving the spider projecting upwardly into the hopper and provided with radial arms for agitating the bulk mass of finely divided material in the hopper.

Further objects of the invention include the provision of means and methods for preventing the rotation of finely divided matter agitated in the hopper, for preventing the entrance of finely divided matter into journals of shafts for driving the spider in the hopper, and for establishing a close adjustable clearing between the bottom of the hopper and the spider.

Other and further objects of the invention will become apparent to those skilled in the art from the disclosures in the specification and the accompanying drawings.

The invention (in a preferred form) is illustrated in the drawings and hereinafter more fully described.

In the drawings:

Figure 1 is a fragmentary elevational view of an apparatus according to the present invention.

Figure 2 is an enlarged fragmentary sectional view along the line II—II of Figure 1, with certain parts shown in elevation.

Figure 3 is an enlarged fragmentary sectional view along the line III—III of Figure 2, with certain parts shown in elevation.

Figure 4 is an enlarged fragmentary sectional view along the line IV—IV of Figure 2.

Figure 5 is an enlarged fragmentary sectional view of a modified form of an apparatus according to the present invention. The view of Figure 5 is taken along a line similar to that along which Figure 4 is taken.

As shown on the drawings:

The reference numeral 10 indicates generally an apparatus according to the present invention. Referring to Figures 1 and 2, the apparatus comprises a hopper 11 formed by an inverted frustoconical open-bottomed vessel 12, a largely tubular member 13 forming a downward continuation of the vessel 12, and a housing 14 forming the bottom portion of the hopper. A chamber 15 in the housing 14 connects the hopper with a tube 16 adapted to discharge into a conduit system (not shown). A spider rotatably disposed in the bottom of the hopper has arms 17 capable of sweeping across the mouth of the chamber 15 (see also Figure 4). An air jet 18 is inserted into the tubular member 13 for displacing finely divided material indicated by the reference numeral 19 from the pockets between the spider arms 17 into the chamber 15 whence another air jet 20 inserted into the housing 14 blows the finely divided material into the tube 16. The chamber 15 is connected to the outer atmosphere by an opening 15A, which permits entrance of air into the chamber 15 to counteract the vacuum which tends to be created by the air jet 20. A shaft 21 for driving the spider projects upwardly into the hopper and is provided with radial agitating arms 22.

As shown more particularly in Figure 2, the hub 25 of the spider projects upwardly and carries agitating arms 26. The wall of the tubular member 13 bulges inwardly above the mouth of the chamber 15. The bulge 27 thus formed projects downwardly to define the ceiling of the interspace swept by the spider arms 17 whose floor is formed by the bottom of the hopper 11 as constituted by the housing 14. As shown in Figure 3, the bulge 27 extends circumferentially on both sides of the mouth of the chamber 15 for a distance such that the passage from the hopper 11 to the chamber 15 is always blocked by at least one spider arm 17 on each side of the mouth of the chamber 15. The air jet 18 discharges into a radial channel 28 in the bulge 27 and thence through a plurality of nozzles 29 parallel to the axis into said interspace between the bulge 27 and the floor of the hopper.

The agitating arms 22 are attached to the shaft 21 by means of a pipe sleeve 30 affixed to the shaft 21 by a drive pin 31.

As shown in Figure 3, the air from the air jet 20 is directed into the discharge tube 16 by a nozzle 32 in a nipple 33. Another nipple 34 serves to attach the discharge tube 16 to the housing 14.

Referring again to Figure 2, a bushing 37 in the housing 14 journals the shaft 21. An air jet 38 serves to admit air through a channel 39 into registering annular grooves 40 and 41, formed, respectively, in the lower face of the hub 25 and in the opposed upper surface of the housing 14.

The shaft 21 is operatively connected to the hub 25 by a key 42 which can slide axially in a groove (not shown) in the hub. A set screw 43 holds the shaft in any desired position of axial displacement relative to the hub.

The shaft 21 is driven by a worm gear including a worm shaft 47 and a gear wheel 48 grooved (not shown) to effect a sliding fit over a key 49 on the shaft 21. To house the worm gear, the lower part of the housing 14 is expanded radially into bell shape and flanged. A cover 50 having a central downwardly projecting boss 51 closes the gear housing thus formed, which is provided with oil 52 through an opening closed by a plug 53.

The boss 51 is pierced by a longitudinal well 55. The upper portion of this well holds a bushing 56 journalling the shaft 21. The lower portion is threaded to receive an externally threaded sleeve 57 spaced from the bushing 56. The lower end portion 58 of the shaft 21, which is threaded terminally and, as a whole, is of smaller diameter than the rest of the shaft, is journalled in the sleeve 57. Thrust ball bearings 59 encircle the shaft portion 58 on both sides of the sleeve 57. A nut 60 holds the lower thrust bearing against the sleeve 57. The upper thrust bearing is held between the sleeve 57 and the shoulder in the shaft 21 formed at the transition point to the reduced end portion 58. A set screw 61 in the boss 51 engaging a lead disk 61a and covered by a plug 61b holds the sleeve 57 in any desired position of axial displacement, aided by the lock nut 62. A cap 63 shields the lower terminal portion of the shaft end 58.

By adjustment of the threaded sleeve 57 and tightening of the lock nut 62 and the set screws 61 and 43, the shaft 21 as well as the spider can be displaced longitudinally relative to the tubular member 13 and the housing 14 and held in any desired position of displacement. The clearance of the spider arms 17 as against the lower surface of the bulge 27 and the upper surface of the housing 14 can thus be regulated at will.

This adjustability makes possible close clearances on both sides of the spider, to prevent siphoning of talc and to effect constant feeding.

Air admitted under pressure from the nozzle 38 into the annular grooves 40 and 41 prevents the entrance of finely divided material into the main journal of the shaft 21 formed by the bushing 37.

The agitating arms 22 and 26 keep talc or other finely divided matter in the hopper 11 from being "hung up" or suspended as the lowermost portions of the finely divided matter are removed by the spider arms 17. The bulge 27 prevents the finely divided matter from rotating along with the agitating arms 26 and the spider arms 17 and also serves to restrict the transfer of finely divided matter from the hopper to the chamber 15 to that transported by the spider. As the rotation of the latter sweeps finely divided matter under the bulge 27 and over the mouth of the chamber 15, air from the nozzles 29 dislodges the matter from the pockets between the spider arms into the chamber 15 whence air from the nozzle 32 moves the finely divided matter into the discharge pipe 16 in the form of a streaming gaseous suspension.

Figure 5 illustrates another device according to this invention. Parts similar to those described hereinabove are indicated by like numerals. This modified device comprises a disk-like spider 66 pierced by a series of round holes 67 adapted to register, on rotation of the disk, with the mouth of the chamber 15. A spider of this type limits more efficiently the movement of certain types of finely divided material from the hopper 11 to the chamber 15 to material transported in the pockets of the spider. In particular, leakage around the outer edge of the spider is prevented, and a more uniform feeding is obtained.

The feeding apparatus described hereinabove is particularly adapted for use in conjunction with a conduit system of the type indicated for impregnating open mesh or porous material. The apparatus, however, is also applicable for use for all purposes that require means for feeding, at a predetermined uniform rate, finely divided matter from the bottom of a bulk mass into a conduit or the like, without "hanging up" of the bulk mass and without "slugging" of the matter being fed.

It will, of course, be understood that various details of construction and of operation may be varied through a wide range without departing from the principles of this invention and it is, therefore, not the purpose to limit the patent granted hereon otherwise than necessitated by the scope of the appended claims.

I claim as my invention:

1. In an apparatus for feeding finely divided matter from a bulk mass into a conduit comprising a bottomed hopper, means defining a chamber communicating with said conduit and having a mouth opening into the bottom of said hopper, a spider having a hub rotatively disposed in the bottom of said hopper for displacing portions of said finely divided matter over the bottom of said hopper to a space above the mouth of said chamber, and a journalled shaft for driving said spider piercing said hopper bottom, the improvement comprising a spider hub and a hopper bottom having circular registering grooves concentric with and spaced from said shaft, and means for admitting air under pressure into said grooves, to prevent the entrance of finely divided matter thereinto.

2. In an apparatus for feeding finely divided matter to a conduit including a bottomed hopper, a chamber communicating with said conduit and opening into the bottom of said hopper, a spider for moving finely divided material over the bottom of said hopper to the space above the opening of said chamber, and a journalled shaft for said spider, the improvement comprising a spider and a hopper bottom having circular registering grooves concentric with said shaft, and multiple jet means communicating with a common source of compressed gas, one jet being directed into the space above the opening downward into said chamber, another jet being directed into said chamber and a third jet being directed into said grooves, said jets serving to displace finely divided matter from the pockets of said spider into said chamber and thence into said chamber while excluding the same from said grooves.

ERIC LUNDGREN.